UNITED STATES PATENT OFFICE.

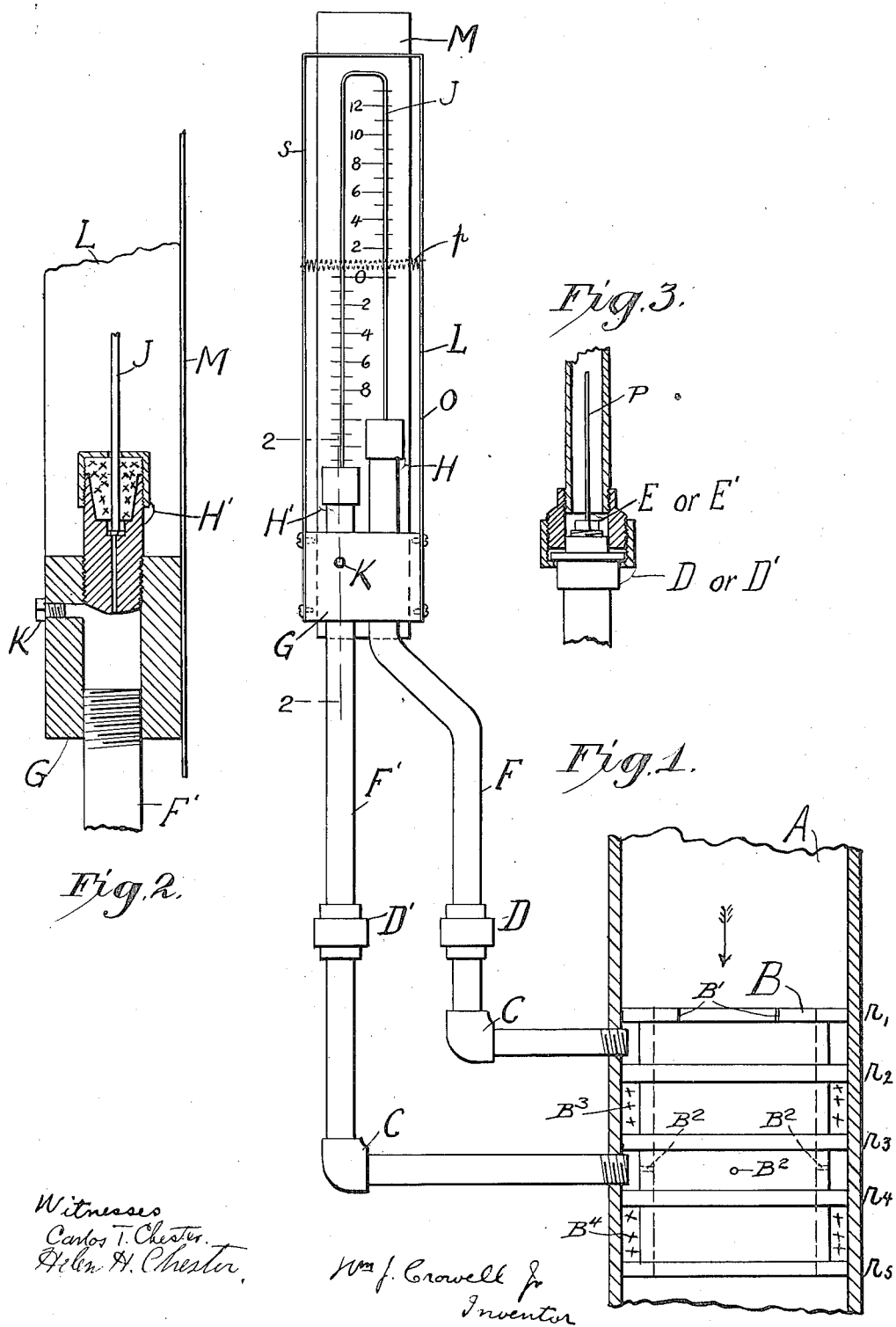

WILLIAM JAMES CROWELL, JR., OF LEBANON, PENNSYLVANIA.

INDICATING DIFFERENTIAL FLUID-METER.

1,306,405.    Specification of Letters Patent.    Patented June 10, 1919.

Application filed March 3, 1917. Serial No. 152,288.

*To all whom it may concern:*

Be it known that I, WILLIAM J. CROWELL, Jr., a citizen of the United States, and a resident of Lebanon, in the county of Lebanon and State of Pennsylvania, have invented certain new and useful Improvements in Differential Fluid-Meters, of which the following is a full, clear, and exact description, reference being had to the accompanying drawing.

My invention relates to differential fluid meters and consists particularly in an improved device for obtaining differential pressure as a function of flow and an improved indicating differential fluid gage of the U type, as hereinafter specifically described, the novel features being pointed out in the claims.

In the accompanying drawing I have illustrated and have hereinafter described in detail a preferred embodiment of my invention. Of the drawings: Figure 1 is an elevation partly in section of the complete metering device. Fig 2 is a partial section on the line 2—2 of Fig. 1, and Fig. 3 is a section of a portion of the piping.

A is a pipe in which flow of water is to be measured, the direction of flow being that of the arrow; B is the improved device for obtaining differential pressure as a function of flow; C and C' are pipe connections, and O is the improved differential gage.

B, the improved device for obtaining differential pressure as a function of flow, consists of a tube of smooth straight internal bore with five projecting rings around it on the outside, $r_1$, $r_2$, $r_3$, $r_4$ and $r_5$, the outside diameter of these tubes being such that the tube will just slip easily into the pipe A, the outer circumference of $r_1$, having small notches B' at various places around it, and there being holes B² through the wall of the tube at various places around a circumference midway between $r_3$ and $r_4$. The inner surface of pipe A in conjunction with B and its projecting rings forms four annular chambers around B, between $r_1$ and $r_2$, between $r_2$ and $r_3$, between $r_3$ and $r_4$ and between $r_4$ and $r_5$; the annular chamber $r_1$ $r_2$ is under the same pressure as exists in A just outside of B, by reason of the notches around the outer circumference of $r_1$; the annular chamber $r_2$ $r_3$ contains packing B³ sealing the chamber $r_1$ $r_2$ from the chamber $r_3$ $r_4$, and the annular chamber $r_4$ $r_5$ contains packing B⁴ sealing the chamber $r_3$ $r_4$ from the pipe A after B; the chamber $r_3$ $r_4$ is under the same pressure as exists inside the tube B, by reason of the holes through the tube walls; the arrangement being such that a flow through A and B produces a differential pressure between the annular chambers $r_1$ $r_2$ and $r_3$ $r_4$, and this differential pressure is transmitted through suitable pipings C and C' to the differential gage; the pipings C and C' project slightly into the annular chambers $r_1$ $r_2$ and $r_3$ $r_4$ so as to prevent a flow from moving B along A.

Tests on B with water with moderate differentials indicate close accord with the usual square root law, flow being proportional to the square root of the differential pressure, with differentials somewhat higher than would be given by a Venturi tube of the same contraction. The improved differential device possesses both Venturi and Pitot characteristics for which reason I have called it a "Pitot-Venturi".

The improved differential U gage consists of an inverted glass U sealed with air or other fluid, so designed that even when sealed with air or other gas its indications are unaffected by fluctuations in static pressure, that means is provided for adjusting the quantity of sealing fluid present, that no valves are required either on the gage or on the piping between the gage and the source of differential pressure; that special throttling tubings needed are in plugs at unions where they are easily inspected, cleaned or removed; that a temporary extraordinary differential will do no hurt other than temporarily breaking the seal, the sealing fluid flowing back into place as soon as the temporary extraordinary differential falls to normal, and that a suitable scale is provided easily adjustable and easily read.

The gage comprises the unions D and D', the throttling plugs E and E', the pipes F and F', the central support and connection G, the screw packing glands H and H', the inverted glass U tube J, the charging and adjusting plug and connection K, the guard for the glass L and the scale M.

The throttling plugs E and E' are screw plugs in the lower halves of the unions D and D', carrying through them the same length of similar small bore tubing P.

The pipes F and F' screw into G and are adjusted in size and length so that the total internal volume of the apparatus above the unions D and D' is approximately such that just enough atmospheric air may be trapped above D and D' to half fill the U tube J when compressed to the probable maximum operating pressure, that is a volume approximately equal to one half the internal volume of J multiplied by the probable maximum operating pressure measured in atmospheres (absolute pressure), thus making the internal volume of the apparatus as great but no greater than may be needed to obtain sufficient air for a proper seal.

The central support and connection G rigidly supports the pipes F and F', the glands H and H', the guard L, carries the plug K, forms interior connections between F and H and between F' and H' and K, and also supports one end of the scale M.

The screw packing glands H and H' are conveniently packed with ordinary rubber stoppers placed over the glass.

The glass inverted U tube J has its two limbs of the same bore and of uniform bore.

The adjusting plug and connection K is from the highest part of the enlarged connection between F' and H' as shown and the interior volume between the bottom of H' and the visible part of J just above H' is less than one half the interior volume of the visible part of J, so that in removing an excess of air or other sealing fluid from J at K the quantity of sealing fluid still present may be indicated by the length of its column still visible in J. The quantity of air originally trapped above D and D' is usually in excess of the quantity that should be present in J and the excess is removed at K by loosening the plug until the water from H rises slowly in J, passes slowly over the bend and slowly down toward H' until opposite a mark $s$ on L when just the right quantity of air remains and the plug is tightened, the air flowing back to its proper place in the upper half of the inverted U tube. The position of $s$ is determined experimentally and is the same whatever the static pressure or whatever sealing fluid is used.

The guard L is a metal plate fastened at its ends to G, carrying the spring $p$ and supporting the upper end of the scale M.

The scale M back of the glass inverted U tube J is readily adjustable in position, being held in place by the spring $p$ on one side and the top of L and the back of G on the other, the tension of the spring $p$ pushing the scale M against the top of L and the back of G being such as to hold the scale wherever set while permitting easy adjustment of the scale to different positions by sliding it. The scale divisions are from zero up on the high pressure side and from zero down on the low pressure side, the correct reading being the average of the high-pressure and low-pressure readings, the high-pressure and low-pressure readings being the same when the zero of the scale is in mid position; thus if the scale shows 5.0 on one side and 6.0 on the other the reading is 5.5 and if the scale is adjusted by pushing it up or down so that its zero is in mid position, then the scale will show 5.5 on both sides.

Fluctuations in static pressure vary somewhat the mid position for the scale but the great ease with which the scale is adjusted to any position and having the scale divisions from zero up on the high-pressure side and from zero down on the low-pressure side makes it always easy to obtain the correct reading.

The differential pressure is given by the difference in height of the water columns in the two limbs of the U tube, shown on the scale M, all connections from the U tube to A being filled with water.

The usual seal is air whatever liquid fills the connections below the seal; in special cases as when relatively high readings are desired from very small differentials some liquid immiscible with water and lighter than water, as gasolene, may be used, charged at K after loosening the union H'; the same differentials give readings about four times as high with gasolene and water as with air and water, but the necessity for calibration when gasolene is used and the fact that a water-gasolene differential reading is generally less reliable than a water-air differential reading makes it doubtful whether it is ever of real advantage to do this.

If differentials are very high the gage may be turned over and used as an ordinary mercury U tube, charged with mercury at K.

When used to measure water, steam, wet gas or wet air, connections below the air seal are everywhere full of water and the readings are of water-air differentials; when used to measure oil, connections below the air seal are everywhere full of oil and the readings are of oil-air differentials; when used to measure dry air or dry gas the gage is inverted (the scale being reversed) and charged with water at K, the readings being of water-air or of water-gas differentials.

Obvious advantages of the inverted air-seal U over the ordinary upright type are, first, that it keeps clean; dirt settles out of it instead of into it; second, that operating differentials are much lower, usually less than one tenth as great as when a mercury U is used, resulting in less than one tenth as great pressure loss in the line at the differential device; and third, absence of mercury, the seal being atmospheric air caught automatically at the gage.

Obvious advantages of the differential device B over the Venturi are its small size, its cheapness and the extreme ease with which it may be installed, inspected or removed; an advantage over the Pitot is that it measures the flow across the whole pipe instead of the flow at some one point of the pipe section, a slight shifting of the position of a Pitot often materially changing the Pitot reading, a varying factor absent in my device. An advantage over the diaphragm orifice is lack of any doubt as to where connections should be made, or of any high degree of care in getting these connections exactly right, a slight change in the position of connections to a diaphragm orifice often changing its differential reading materially.

The form of the "Pitot-Venturi" is so simple that there is no difficulty in making successive tubes exactly the same and to standard dimensions, dimensions that are very easily checked up exactly by any one at any time, with the result that one careful calibration of one tube of standard size calibrates the standard size making all tubes of that standard size into dependable and accurate meters.

Having now described my invention, what I claim as new and desire to secure by Letters Patent, is:

1. A tubular member formed with two peripheral pockets and with channels connecting one of said pockets to the bore of said member, and adapted to be mounted in a conduit with the last mentioned pocket out of communication with the conduit at either end of the member, and with the other pocket in communication with the conduit at one end of the member.

2. A tubular device adapted to be inserted in a conduit to create a flow function pressure differential therein, and formed externally with four circumferential grooves, and having channels leading from an intermediate one of said grooves to the bore of the device.

3. The combination of a tubular member formed with two peripheral pockets, and with channels connecting one of said pockets to the bore of said member, and a conduit in which said member is mounted with the last mentioned pocket out of communication with said conduit except through said channels, and with the other pocket in communication with said conduit at one end of the member.

4. In combination a differential pressure gage of the glass U tube type, having its limbs of the same uniform bore, and pressure transmitting connections to the ends of the U tube, including flow reducing devices in the form of a pair of sections, of small bore piping of the same length and bore located one in each connection.

5. In an inverted glass U tube gage, the combination with a U tube proper having its limbs formed with the same uniform bore, conduit extensions of the U tube of larger bore than the U tube bore, and a pair of similar throttling devices arranged one in each of said extensions, one of said extensions having a charge adjusting orifice between the throttling device therein and the U tube proper and an adjustable closure for said orifice.

6. In a differential pressure gage of the inverted glass U tube type, the combination with the U tube, of a chambered support to which the lower ends of the U tube are connected, such support being formed with a charge adjusting orifice, a removable closure for said orifice, and pressure transmitting pipes connected to said support.

7. In a differential pressure gage of the inverted glass U tube type, the combination with the U tube, of a chambered support to which the lower ends of the U tube are connected, such support being formed with a charge adjusting orifice, a removable closure for said orifice, and pressure transmitting pipes connected to said support, a guard for the U tube secured to said support, an adjustable scale and a spring holding said scale in frictional engagement with said guard and support.

8. The device for obtaining differential pressure as a function of flow, consisting of a tube of smooth straight internal bore with five projecting rings about it on the outside and with suitable holes and notchings for pressure connections in combination with a differential pressure gage, consisting of a rigid connection and support having screw packing glands and an inverted glass U tube on the upper side, pipe connections with unions and throttling plugs on the lower side, an adjusting plug and connection on one of the vertical sides, a suitable scale for the glass U tube; the inverted glass U tube having its two limbs of uniform bore, the throttling plugs operatively consisting of two similar lengths of small bore tubing, and a spring holding the scale in place, all substantially as set forth.

WILLIAM JAMES CROWELL, Jr.